United States Patent [19]

Miklos et al.

[11] 3,873,975

[45] Mar. 25, 1975

[54] SYSTEM AND METHOD FOR AUTHENTICATING AND INTERROGATING A MAGNETIC RECORD MEDIUM

[75] Inventors: Richard L. Miklos, Maplewood; Jack E. Blackburn, Oakdale, both of Minn.

[73] Assignee: Minnesota Mining and Manufacturing Company, St. Paul, Minn.

[22] Filed: May 2, 1973

[21] Appl. No.: 356,604

[52] U.S. Cl. ...................... 340/149 A, 235/61.11 D

[51] Int. Cl. .......................... G06k 7/08, G11b 5/00

[58] Field of Search ..... 340/149 A, 149 R, 174.1 R, 340/174 NA, 174 HA, 174 GA; 179/100.2 A, 100.2 D, 100.2 MD, 100.2 S, 100.2 B; 346/74 M; 235/61.11 D

[56] References Cited

UNITED STATES PATENTS

| | | | |
|---|---|---|---|
| 3,200,207 | 8/1965 | Rainer et al. | 179/100.2 CH |
| 3,566,356 | 2/1971 | Holm et al. | 340/149 A |
| 3,573,981 | 4/1971 | Ahn et al. | 340/174 NA |
| 3,609,684 | 9/1971 | Lipp | 340/149 R |
| 3,626,160 | 12/1971 | Hagopian | 235/61.11 D |
| 3,714,664 | 1/1973 | Fayling | 346/74 M |
| 3,739,086 | 6/1973 | Heather | 179/100.2 S |

OTHER PUBLICATIONS

"IBM Technical Disclosure Bulletin, Vol. 9, No. 11, April 1967, pg. 1499;1500 – J. J. Hagopian.

*Primary Examiner*—Donald J. Yusko
*Attorney, Agent, or Firm*—Alexander, Sell, Steldt & DeLaHunt

[57] ABSTRACT

A magnetic record medium, including a sheet having a layer containing magnetically anisotropic particles wherein the particles are permanently physically aligned at selected locations to form a fixed information pattern, is used in an authentication system in which the medium is subjected to magnetizing fields along two transverse directions to differently magnetize the particles depending upon the physical alignment thereof with respect to the field. The different magnetizations are sensed to produce signals representative of the selected locations, which signals are compared to authenticate the medium.

The medium is further used in information processing systems in which a substantially unidirectional magnetizing field differently magnetizes the differently physically aligned particles, and in which the different magnetization is sensed to produce a signal representative of the fixed information.

16 Claims, 6 Drawing Figures

SYSTEM AND METHOD FOR AUTHENTICATING AND INTERROGATING A MAGNETIC RECORD MEDIUM

CROSS REFERENCE TO RELATED APPLICATION

This application is related to the copending application of the present inventors, entitled MAGNETIC RECORD MEDIUM AND INFORMATION PROCESSING SYSTEM, U.S. Ser. No. 356,605 to the application of Richard E. Fayling, entitled MAGNETIC RECORD MEDIUM AUTHENTICATION SYSTEM, U.S. Ser. No. 356,602, and to the application of Richard E. Fayling and Douglas D. Campbell entitled MAGNETIC SECURITY DOCUMENT AND METHOD FOR MAKING SAME, U.S. Ser. No. 356,603 all of which applications were filed on May 2, 1973, and are assigned to the same assignee as this application.

BACKGROUND OF THE INVENTION

1. Field of the Invention

This invention pertains to magnetic recording and especially to the adaptation of magnetic recording techniques for authenticating and interrogating record media.

2. Description of the Prior Art

The expanded use of credit cards, airline tickets, stock certificates and like security documents has created a great need for record media which cannot be easily altered or counterfeited and for a system for authenticating such record media. As used herein, a security document is a type of record medium which contains at least two forms of information: visible indicia relating to the intended use of the document; and a permanent fixed information pattern, such as a code pattern, usually concealed and difficult to reproduce so as to inhibit or prevent counterfeiting. Many such record media include magnetic recording material to enable recording of data for subsequent machine processing. The magnetic material may be employed for conveying temporary information and media authentication and/or other fixed information. U.S. Pat. No. 3,566,356 discloses a multi-purpose magnetic record medium which contains a layer or layers of a composite of magnetizable material having particular hysteretic response characteristics. Authentication of the medium is accomplished by comparing the signal response produced upon subjecting the medium to a demagnetizing field with a predetermined range of signal values typical of the particular hysteretic response characteristics of the material. Such record media, however, require specially prepared magnetic materials.

Other magnetic record media, which are disclosed in U.s. Pat. Nos. 3,052,567, 3,219,353 and 3,328,195, contain multiple layers designed to respond to different frequency ranges or to provide easily erased information on one layer and more difficulty erased information on another layer. A media can be authenticated by observing the presence of a particular fixed information pattern, such as a code pattern, recorded on the layer from which information is more difficulty erased such as is set forth in U.S. Pat. No. 3,404,392. However, such authentication could be thwarted by the use of conventional recording techniques to erase or alter the recorded fixed information code pattern.

SUMMARY OF THE INVENTION

The systems and methods for authentication and interrogation according to the present invention utilize a record medium having magnetically detectable permanent fixed information pattern. Such a record medium is prepared by first providing a sheet having a non-magnetic backing and a layer thereon of a substantially uniform dispersion of magnetically anisotropic magnetizable particles which are temporarily free to rotate. The magnetizable particles at selected locations in the layer are physically aligned differently from the direction of physical alignment of the particles at a reference location in the layer to form a fixed information pattern, such as by passing the sheet along a travel path adjacent a cylinder rotatively positioned with respect to the path. The cylinder has a plurality of permanent magnets located about the periphery in a pattern corresponding to the fixed information pattern and has the magnets oriented to provide magnetic fields in the layer when adjacent thereto. The cylinder is rotated as the sheet is passed adjacent thereto to apply the magnetic fields in the layer to physically align the magnetizable particles at the selected locations to implant the fixed information pattern in the layer. The particles are thereafter permanently immobilized to make the fixed information pattern permanent, such as by heating the sheet. The record medium may be converted into a security document by further applying to the sheet visible indicia characteristic of an intended use of the record medium as a security document.

The information pattern may also be implanted in a sheet such as just described by passing the sheet along a travel path adjacent a plurality of electromagnets positioned with respect to the path to provide the aligning magnetic fields in the layer when adjacent thereto, which electromagnets are selectively energized as the sheet is passed along the path to produce fields in the layer corresponding to the fixed information pattern.

In making the record medium, as just described, it is preferred to first physically align all the magnetizable particles in one direction and then to differently physically align the particles at selected locations transverse to the one direction.

In one embodiment of the present invention, an improved and simplified system for authenticating a record medium, such as the medium described above is provided. In this system, a magnetic field is produced along a track parallel to the physical alignment of the magnetizable material within the selected locations to magnetize the material within the selected locations, and to differently magnetize at least a portion of the material in the remainder of the layer adjacent the selected locations, depending upon the physical alignment of the material along the track. The magnetization of the magnetized material along the parallel track is then sensed to provide a first signal representative of the selected locations. A magnetic field is also produced along a track transverse to the physical alignment of the magnetizable material within the selected locations to magnetize the material within the selected locations and to differently magnetize at least a portion of the material within the remainder of the layer adjacent the selected locations, depending upon the physical alignment of the material along the transverse track. The magnetization of the magnetized material along the transverse track is then sensed to provide a second signal representative of the selected locations, after which the authenticity of the document is established by comparing the amplitudes of the two signals so produced. In one preferred embodiment of this system, the authenticity of the magnetic recording medium is established by the production of a code identification signal indicative of a selected location whenever a signal derived from a given selected location by magnetizing and sensing a track in a direction parallel to the alignment of the material within that selected location has a first amplitude and a signal derived from the same selected location by magnetizing and sensing a track transverse to the alignment of the material within that selected location has a second lower amplitude.

Another embodiment of the present invention is a system for interrogating a magnetic record medium such as the medium described hereinabove. In this embodiment, a substantially unidirectional magnetic field is applied to differently magnetize the magnetizable particles depending upon the physical alignment thereof. The magnetization of the differently magnetized particles is then sensed upon traversing the record medium to provide a signal representative of the fixed information pattern. A preferred embodiment of this system further includes a device for demagnetizing the differently magnetized particles to inhibit magnetic detection of the selected locations unless and until the substantially unidirectional magnetic field is again applied to the magnetic recording layer.

DESCRIPTION OF THE PREFERRED EMBODIMENTS

Figures 1, 2, 3:
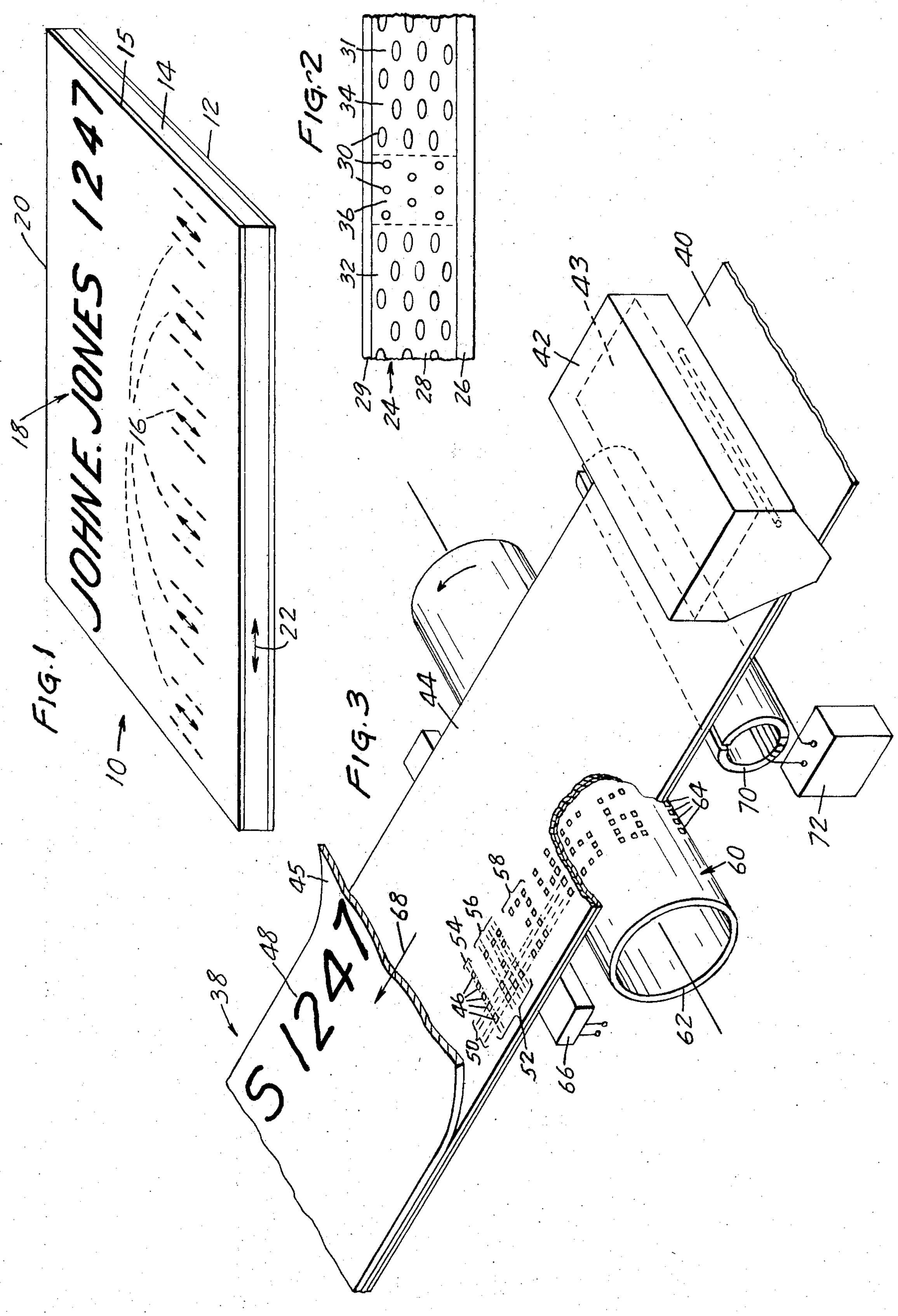
FIG. 1 is a three dimensional view of an embodiment wherein a medium is used as a security document having selected locations within a layer in which acicular gamma-$Fe_2O_3$ particles are uniformly dispersed and are physically aligned differently from the gamma-$Fe_2O_3$ particles contained in the remainder of the layer.
FIG. 2 is an enlarged cross sectional view of a segment of the security document shown in FIG. 1.
FIG. 3 is a combined three dimensional and schematic view of a system for forming a security document such as herein described.

FIG. 1 shows a security document 10 which comprises a substrate 12, a magnetic recording layer 14 containing uniformly dispersed magnetically anisotropic particles of gamma-$Fe_2O_3$, and an outer layer 15 upon which printable indicia 18 are presented. By uniformly dispersed it is herein meant that the particle density, i.e., the number of particles per unit area, is approximately constant throughout the layer even though the particles may be differently, physically aligned at various locations. The particles within a plurality of selected locations 16 are differently physically aligned with respect to a reference location, which may, for example, be along an edge 20 of the document 10. Double headed arrows such as at the selected loctions 16 are used herein to indicate the easy direction of magnetization produced by the physical alignment of the magnetizable particles. Anisotropic particles such as gamma-$Fe_2O_3$ readily magnetized in either direction parallel to their easy direction of magnetization and retain a higher level of remanent magnetization after having been magnetized with a given applied field than is retained after having been magnetized with the same applied field in a direction other than the easy direction. Single headed arrows are used herein to depict various directions of magnetization or of magnetic field.

In one embodiment of the present invention, the magnetizable particles within those portions of the magentic recording layer 14 which are not contained within the selected locations 16 may be unaligned. Alternatively, the magnetizable particles within all portions of the magnetic recording layer 14 not contained within the selected location may be physically aligned along a direction such as indicated by the arrow 22.

FIG. 2 is an enlarged cross-section of a portion of another security document 24, comprising a non-magnetic backing 26, a magnetic recording layer 28 and a printable layer 29 upon which visible indicia characteristic of the use of the security document are applied. The magnetizable particles within the magnetic recording layer 28 are further enlarged for graphic clarity. The layer 28 contains acicular particles 30 of gamma-$Fe_2O_3$ uniformly dispersed within a flexible binder 31. The layer 28 is shown to have background portions 32 and 34 wherein the particles are uniformly physically aligned in one direction parallel to both the surface and the long dimension of the security document 24. Since shape anisotropy is paramount in gamma-$Fe_2O_3$ particles, the easy direction of magnetization is parallel to the long dimension of particles. The easy direction in the background portions 32 and 34 is, therefore, also parallel to both the surfce and a long dimension of the document. Portion 36 represents a selected location within which the particles 30 are further physically aligned, still parallel to the surface of the document 24 but also normal to the physically aligned particles within the background portions 32 and 34. The delineation between the portions 32 and 34 and the selected location 36 is shown for purposes of clarity as an abrupt transition in the direction of alignment of the particles. Due to the normal divergence of magnetic flux, such a transition will generally extend over a distance dictated by the characteristics of the aligning magnetic field.

When a conventional magnetic recording field is applied along the long dimension of the document 24; i.e., along the direction of physical alignment of the particles within the background portions 32 and 34, the particles within those portions will be readily magnetized and will retain a higher state of remanent magnetization than is produced within the selected location 36 where a direction other than the easy direction of magnetization is presented to the magnetizing field. Upon playback, a high amplituide signal will be produced corresponding to the background portions 32 and 34 while a lower amplitude signal is produced corresponding to the selected location 36.

The magnetic recording layers used in the security documents and magnetic record media of the present invention may conveniently be a stripe of conventional magnetic recording media formed or affixed to a substrate such as a standard 30 mil. (0.76mm) credit card stock. Such stock is readily obtained as 26 mil (0.66mm) thick sheets of 95 weight percent polyvinyl chloride-5 weight percent polyvinyl acetate. If desired, the printable layer 29 may be eliminated by adding titanium dioxide pigment to the substrate composition to provide a printable surface. If further desired, an outer protective 2 mil (0.051mm) layer of 95 weight per cent polyvinyl chloride-5 weight percent polyvinyl acetate may be heat fused to the pigmented layer after the visible indicia have been applied thereto. The magnetic recording layers are typically formed of a mixture of the magnetizable material, a non-magnetic flexible organic binder and a suitable solvent, which is coated onto the substrate and subjected to appropriate magnetic fields to physically align the particles. In a typical case, such a coating comprises a uniform dispersion of 65 weight percent gamma-$Fe_2O_3$ acicular particles (typically 500 nanometers long and 100 nanometers diameter) and 35 weight percent thermoplastic polyurethane binder together with a suitable solvent. Other formulations may similarly be employed consistent with known magnetic recording media formulations.

FIG. 3 is a three-dimensional view of a method of making a security document 40 such as depicted in FIGS. 1 and 2. A non-magnetic backing 38 is moved past a coater 42 within which there is a dispersion 43 of anisotropic gamma-$Fe_2O_3$ particles, binder and appropriate solvents. A layer 44 is thereby applied to the backing 40, in which layer 44 the particles remain free to rotate within the binder until the solvent evaporates, thereby hardening the layer 44. Prior to such evaporation, the layer is passed adjacent an aligning device 60 which produces within the layer the selected locations 46, positioned at the intersections of a plurality of parallel rows 50 and columns 52 perpendicular to the rows. The aligning device 60 is shown to comprise a rotatably positioned cylinder 62 having a non-magnetic outer surface on which are mounted discrete permanent magnets 64 arranged to correspond with the desired groups of selected locations 46 representing given alphameric characters 54, 56, 58. In one embodiment, each discrete permanent magnet 64 is desirably formed from a flexible rubber magnet material such as "Plastiform" Brand rubber bonded permanent magnets manufactured by Minnesota Mining and Manufacturing Company. Such material is described in U.S. Pat. No. 2,999,275. It is generally produced in a sheet wherein it is readily magnetized to produce a magnetic field having a major field component normal to the plane of the sheet. To effectively physically align the gamma-$Fe_2O_3$ particles within the selected locations parallel to the surface of the backing 38, it is necessary to form the magnets 64 by assembling sections of a sheet of such rubber bonded material to have the plane of each section extending radially from the cylinder surface. In this manner a substantially unidirectional magnetic field is produced which extends along a tangent to the surface of the cylinder 62. Such a field is most effective in producing the desired physical alignment with the selected locations 46. In a similar manner, other nonrepetitive patterns of selected locations 46 may be formed. After the selected locations 46 are formed, the particles are immobilized by passing the layer 44 past a heat source 66 to promote evaporation of the solvent or otherwise produce hardening of the organic binder.

In a preferred embodiment the particles in the layer 44 are initially physically aligned in a direction shown by the arrow 68. This initial physical alignment is produced by the application of a substantially unidirectional uniform magnetic field having a major field component in the direction of the arrow 68. Such a field is conveniently produced by a electromagnet 70 energized by the power source 72 in accordance with conventional magnetic recording media manufacturing techniques.

The record medium may be advantageously employed in the form just described. If desired, temporary data may be magnetically recorded onto the medium in accordance with conventional magnetic recording techniques. Additional systems for making and using similar record media are described and claimed in the above cross referenced patent applications by the present inventors and by Richard E. Fayling and Douglas D. Campbell, the disclosures of which are incorporated herein by reference.

In a further embodiment in which the record medium is used as a security document, an outer layer 45 carrying printed indicia characteristic of an intended use for the document is affixed to the magnetic recording layer 44. Such indicia may be preprinted onto a pressure sensitive tape which is then applied to the magnetic recording layer 44.

Figure 4:
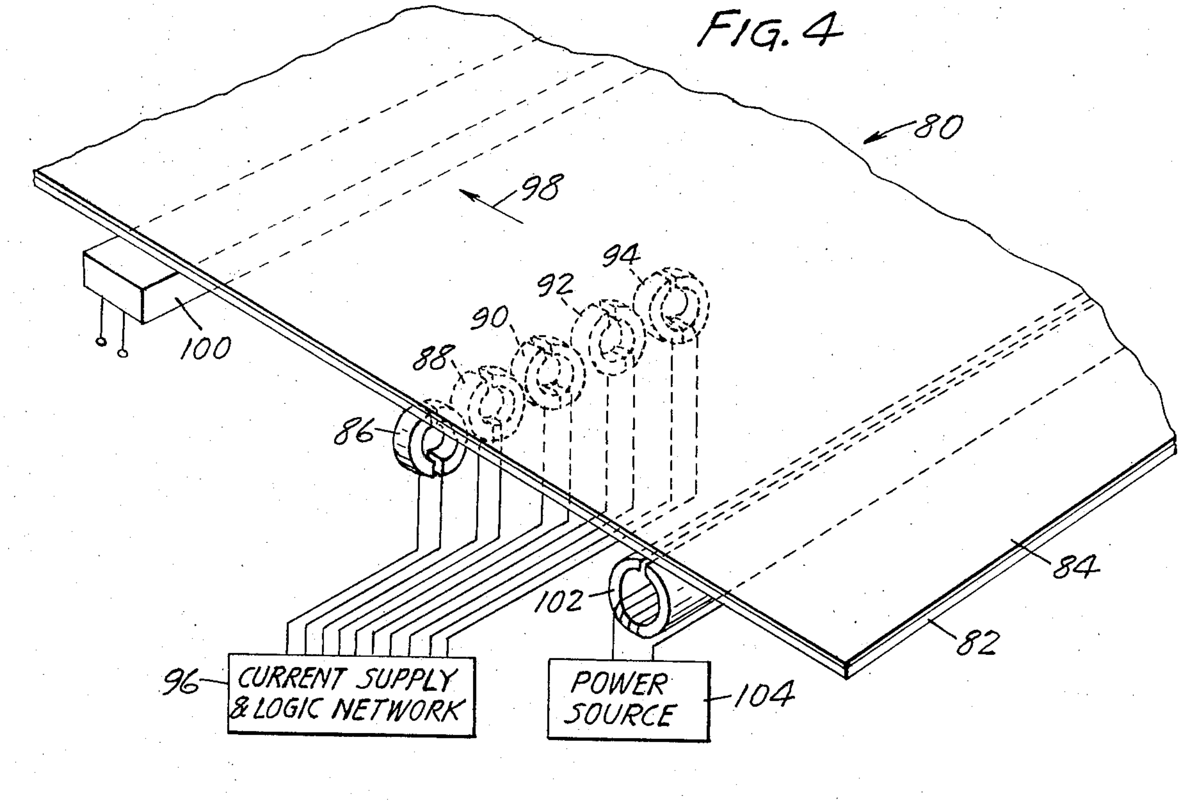
FIG. 4 is a combined three dimensional and schematic view of an alternative system for forming a record medium such as herein decribed.

Another embodiment for forming the selected locations within a magnetic recording layer of a record medium 80 is shown in FIG. 4. In this embodiment, the magnetic recording layer 84 on a backing 82, in which layer the magnetic particles are temporarily free to rotate, is passed adjacent a number of magnetic sources 86, 88, 90, 92 and 94, which are selectively energized by electrical current pulses from a current supply and logic network 96 to produce localized magnetic fields in the layer 84. Such magnetic field sources are conveniently conventional magnetic recording heads. When the devices 86, 88, 90, 92, and 94 are selectively energized, a localized, substantially unidirectional magnetic field is produced which causes the particles within selected locations of the recording layer 84 to be physically aligned perpendicular to the direction shown by the arrow 98. Subsequent the formation of the selected locations to form a magnetically detectable code pattern, the magnetizable material in the layer 84 is permanently immobilized by hardening or otherwise fixing the binder, such as by passing the record medium 80 past an electrically energized heat source 100. In a preferred embodiment, the magnetizable particles in the layer 84 are initially physically aligned parallel to the direction indicated by the arrow 98 by applying a substantially unidirectional magnetic field having a major field component in the direction 98. Such a field is readily produced by a magnet 102 energized by the power source 104, in accordance with conventional magnetic recording media manufacturing techniques. A layer containing printed indicia characteristic of an intended use for the medium may be added in the manner discussed hereinabove.

Figure 5:
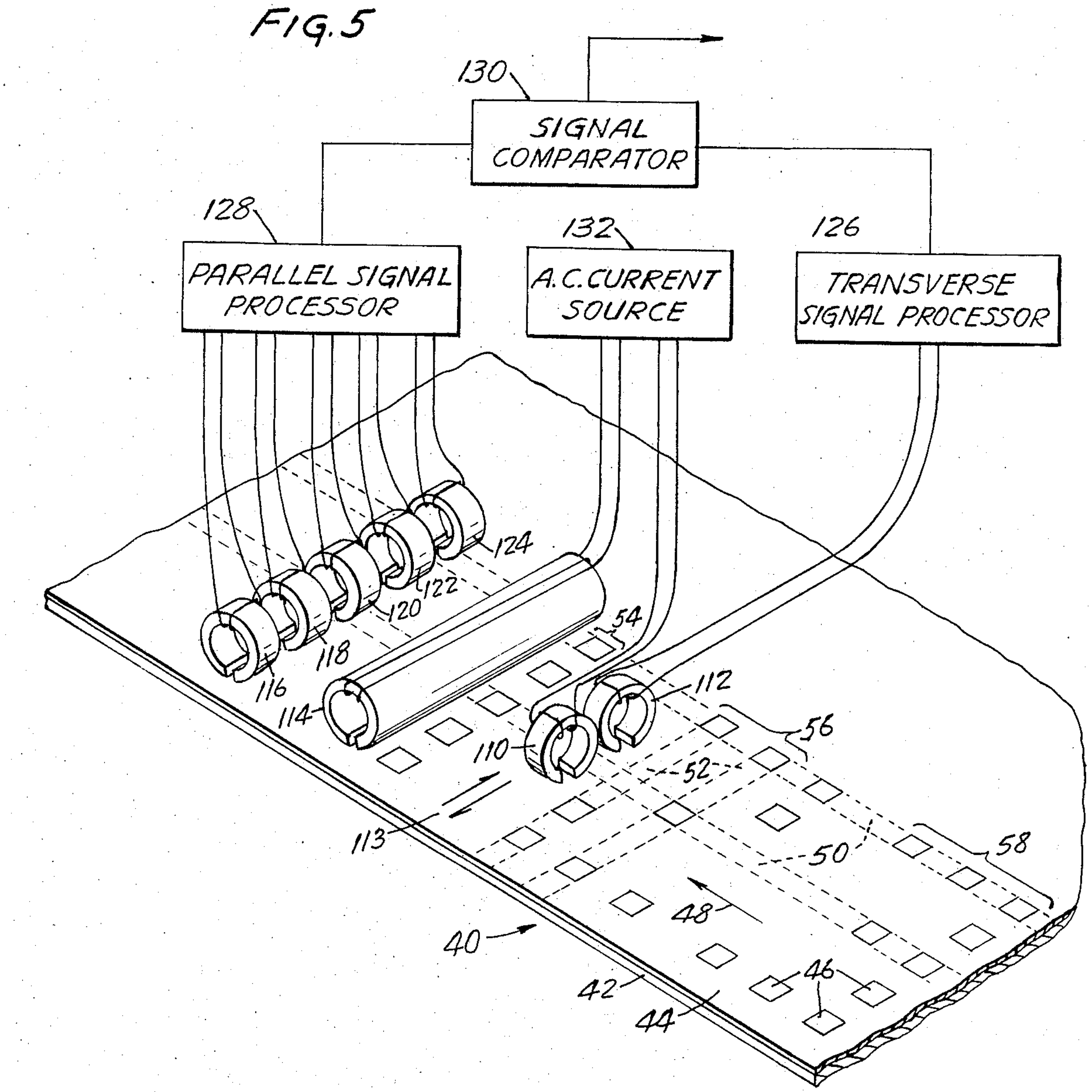
FIG. 5 is a combined three dimensional and schematic view of a system for authenticating a record medium wherein selected locations are magnetized and sensed parallel and traverse to the direction of alignment of physical the magnetizable material within the selected locations.

One embodiment of the present invention is a system for authenticating a security document such as described hereinabove. FIG. 5 shows a portion of a security document 40 adjacent an edge 42. The document 40 has an additional portion (not shown) onto which data may be magnetically recorded in accordance with conventional magnetically recorded techniques. This sytem utilizes a combination of magnetizing and sensing devices positioned adjacent a path parallel to arrow 48 along which the security document 40 is moved. A first pair of magnetizing and magnetic sensing devices 110 and 112 respectively, are mounted on a movable carriage to enable the devices 110 and 112 to be traversed across the document 40 in a direction 113 normal to the direction of movement of the document 40, thus traversing the columns 52. The movable carriage upon which the magnetizing and sensing devices 110 and 112 are mounted, are not shown for purposes of clarity. In one embodiment, the magnetizing device 110 is energized with a sufficient, uniform amplitude, AC current from current source 132 to produce a substantially unidirectional magnetic field having a major filed component normal to the direction of travel of the field 40. The field thus magnetizes the magnetizable material along the columns 52 when the magnetizing device 110 is moved thereby. Where the easy direction of magnetization of the material is parallel to the columns 52, such as is provided within the selected locations 46, a high remanent magnetization state is obtained. In contrast, a lower state of remanent magnetization is produced in the remainder of the layer along the columns 52, wherein the easy direction of magnetization is parallel to arrow 48, and perpendicular to the major field component produced by the magnetizing device 110.

The magnetic sensing device 112 traverses the columns 52 after the material within each column has been differently magnetized, and senses the varying remanent states within each column. Thus as the sensing device 112 passes over a selected location 46 having a high state of remanent magnetization, a signal of a first amplituide will be produced, and when it passes over the remainder of the column, wherein a lower state of remanent magnetization exists, a lower amplitude signal will be produced.

A second combination of magnetizing device 114 and magnetic sensing devices 116, 118, 120, 122 and 124 are provided for magnetizing and sensing the resultant states of remanent magnetization along the rows 50 parallel to the direction of travel of the document 40. The magnetizing device 114 is positioned adjacent the path of the document 40 and is energized with a sufficient, uniform intensity, AC current from a current source 132 to impress upon the regions encompassing rows 50 a substantially unidirectional, uniform alternating magnetic field having a major field component parallel to the direction of travel of the document 40. This produces along each row a high state of remanent magnetization within the portions of the layer 44 wherein the easy direction of magnetization is parallel to the direction of travel 48 and produces a lower state of remanent magnetization within selected locations 46 where the easy direction of magnetization is normal to the direction of travel.

One of the magnetic sensing devices 116, 118, 120, 122 and 124 is positioned adjacent each of the rows 50 to sense the remanent magnetization within each row as the document 40 passes thereby. The presence of a selected location 46 within a given row, wherein a lower state of remanent magnetization is now sensed, results in the generation of a correspondingly lower amplitude signal than that produced from the remainder of that row. Signals produced in the transverse sensing device 112 are coupled to a transverse signal processor unit 126 and signals produced by the parallel sensing devices 116, 118, 120, 122 and 124 are coupled to a parallel signal processing unit 128. The processing units demodulate the sensed states of remanent magnetization and produce output signals indicative of the varying magnetic remanance produced by the selected locations 46. The output signals are coupled to a signal comparator unit 130, which compares signals arising from a given selected location at an intersection between a given row and column, and produces a code identification signal indicative of a code location whenever the appropriate high and low amplitude signals derived from a given selected location are sensed.

In one embodiment, the intersections of the rows and columns form a dot pattern. The selected locations are formed at predetermined intersections to form dot patterns representations of alphameric characters, such as the characters designated 54, 56 and 58 in FIG. 3. The code identification signals produced in response to such a dot pattern may be processed in a conventional manner to characterize the associated alphameric character.

In the embodiment just discussed, the transverse and parallel magnetizing devices 110 and 114 respectively, are coupled to an AC current source 132 to provide an identical sufficient uniform amplitude AC signal to the magnetizing devices, thereby producing identical alternating magnetic fields along both of the respective tracks. In other embodiments, a DC field or other periodically varying field may be utilized. The parallel magnetizing device 114 is conveniently a single C-shaped electromagnet extending across all of the rows 50. It is obvious that the magnetizing device 114 may readily comprise a plurality of discrete magnetizing devices such as conventional magnetic recording heads, each of which extends across a given row in a manner analogous to that of the sensing devices 116 through 124. The sensing devices 112, 116, 118, 120, 122 and 124 may similarly be conventional magnetic recording playback heads.

Figure 6:
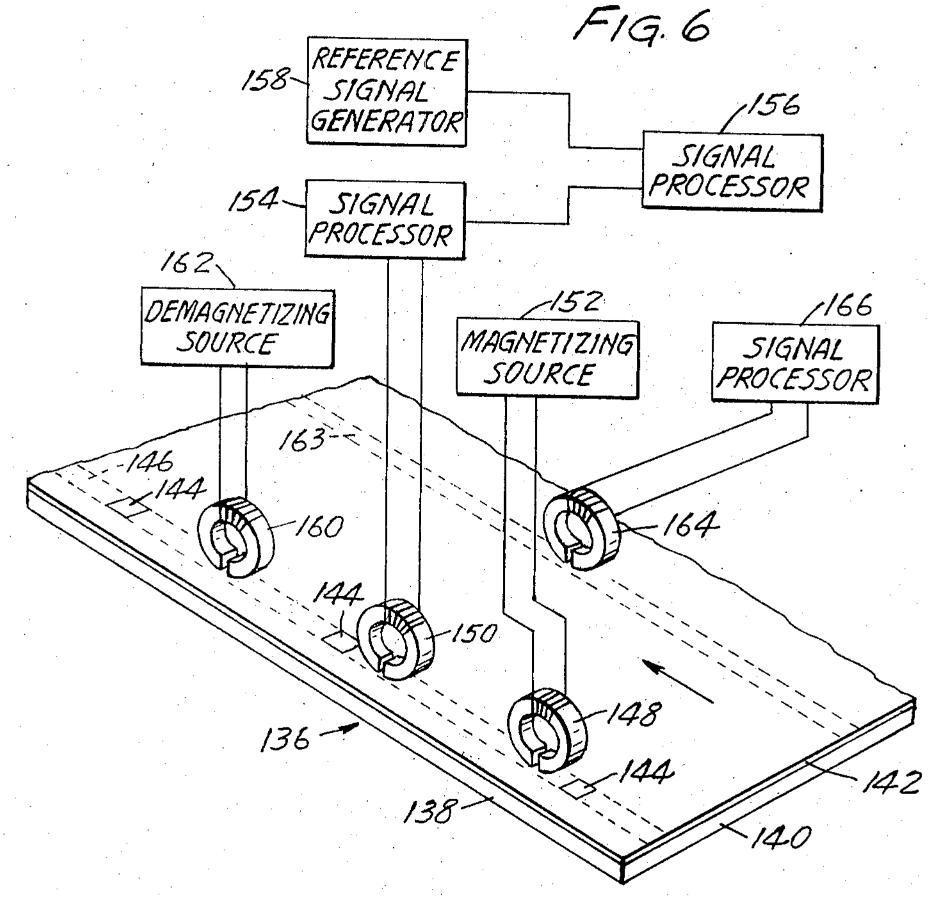
FIG. 6 is a combined three dimensional and schematic view of a system where selected locations in the magnetic recording layer of the record medium are sensed to provide signals representative of the selected locations.

FIG. 6 illustrates a system for interrogating a record medium 136 such as described hereinabove, wherein the record medium 136 comprises a backing 140 and a magnetic recording layer 142 in which the selected locations 144 representing a magnetically detectable permanent fixed information pattern are positioned along a track 146 paralel to an edge 138. The magnetizable material, such as anisotropic particles, within the selected locations 144 are preferably physically aligned normal to the track 146 while such particles in the remainder of the layer are preferably physically aligned parallel to the track 146. The record medium 136 is moved past a magnetic field generating device 148 such as a conventional magnetic recording head, which produces a substantially unidirectional magnetic field having a major field component parallel to the track 146. Alternatively, the field generating device 148 may be an appropriately shaped and positioned permanent magnet. As the record medium 136 passes the field generating device 148, all portions of the track 146 are subjected to a constant intensity DC magnetic field to differently magnetize the particles depending upon the physical alignment thereof along the track. This produces varying states of remanence in the particles, such that as the record medium 136 thereafter passes adjacent the sensor device 150, the varying states of remanence are sensed to provide a signal representative of the selected locations 144 which comprise the fixed information pattern. The signals from the sensor device 150 are then coupled to the signal processor unit 154. The sensor device 150 is preferably a conventional magnetic recording play-back head, however, Hall probes or other magnetic field sensors may likewise be used. The signal is then processed in a signal processor unit 154 which converts the sensed signals to a form compatible with standardized information processing formats. When the sensed signals are counted from a known location on the record medium 136 such as the beginning or leading edge thereof along the direction of travel, and are compared with a reference signal such as produced by a reference signal generator 158, the specific location of any given on of the selected locations may be determined. The two signals are readily compared by conventional electronic processing circuits such as contained within a signal processor unit 156, which produces an output signal to be coupled to indicator devices, control mechanisms and the like.

In all the embodiments described hereinabove, once the magnetizable particles are differently magnetized, the patterns represented by the spacing between or physical alignment of the particles within the selected locations can also be revealed by the use of magnetic viewer devices. Such revelation can be inhibited by passing the record media or security documents past a demagnetizing device which demagnetizes the particles and prevents any subsequent direct magnetic detection of the selected locations unless and until a unidirectional magnetic field is again applied. The selected locations remain physically aligned, and may be repeatedly interrogated in the manner just described. In FIG. 6, such a demagnetizing device 160, which is preferably a conventional magnetic recording erase head, and which is conventionally energized by the AC demagnetizing supply source 162, is applied along the track 146 to inhibit detection unless and until a magnetic field is again applied.

In a further embodiment, the record medium 136 may have other information recorded thereon according to conventional magnetic recording techniques. Track 163 is one such recording track. A second magnetic playback head 164 is positioned to sense the recording on the track 163. signals generated therein are fed to another information processing network 166. If desired, additional record and erase may similarly be provided. Likewise it should be appreciated that many parallel tracks across the record medium 136, various configurations of sensors, and any variety of transport mechanism may be employed.

In a still further embodiment for interrogating a record medium as described above, another magnetic field device is provided for applying in the record medium 136 a second substantially unidirectional magnetic field having its major field component transverse to the direction of the first substantially unidirectional magnetic field to differently magnetize the magnetizable particles depending upon the alignment thereof. A second magnetic sensing device senses the differently magnetized particles upon traversing the record medium 136 to provide another signal representative of the detectable code pattern. The signals representative of the detectable code pattern from the two magnetic sensors are then compared to enhance the reliability of the interrogation of the record medium. In this manner, the double checking of the selected locations is the same as the method of authentication conjunction with FIG. 5 hereinabove.

What is claimed is:

1. A system for authenticating a record medium having a magnetic recording layer containing uniformly dispersed magnetizable material having magnetic anisotropy, wherein the magnetizable material within selected locations of the layer is differently physically aligned from the physical alignment of the material in the remainder of the layer, to provide a magnetically detectable permanent code pattern, which system comprises:

- means for applying a magnetic field along a track parallel to said physical alignment of the material within said selected locations to magnetize the material within said selected locations and to differently magnetize at least a portion of the material in said remainder of the layer adjacent said selected locations, depending upon the physical alignment of the material along said track;
- means for sensing the magnetization of said magnetized material along said parallel track to provide a signal representative of said selected locations;
- means for applying a magnetic field along a track transverse to said physical alignment of the material within said selected locations to magnetize the material within said selected locations and to differently magnetize at least a portion of the material in said remainder of the layer adjacent said selected locations, depending upon the physical alignment of the material along said transverse track;
- means for sensing the magnetization of said magnetized material along said transverse track to provide another signal representative of said selected locations; and
- means for comparing amplitudes of the signals produced by the sensing means to authenticate the record medium.

2. A system according to claim 1, wherein said means for producing magnetic fields along said parallel and transverse tracks comprise means for providing identical alternating magnetic fields along both of the respective tracks.

3. A system according to claim 1, for authenticating a record medium in which said selected locations are positioned at intersections of predetermined parallel rows and parallel columns and said columns are parallel to said direction of material alignment in the selected locations, wherein in the system, said means for producing a magnetic field along a said parallel track and said means for sensing said magnetized materials along said parallel track are adapted for producing said fields and for sensing said magnetization respectively along a plurality of tracks corresponding to said columns, and wherein said means for producing a magnetic field along a said transverse track and said means for sensing said magnetized materials along said transverse track are adapted for producing said fields and for sensing said magnetization respectively along a plurality of tracks corresponding to said rows.

4. A system according to claim 3, wherein the means for comparing signal amplitudes further comprises means for producing a code identication signal indicative of a code location whenever a signal derived from a said selected location by magnetizing and sensing a track in a direction parallel to the physical alignment of the material within said selected location has a first amplituide and a signal derived from the same selected location by magnetizing and sensing a track transverse to the physical alignment of the material within said same selected location has a second lower amplitude.

5. A system for authenticating a record medium comprising:

a record medium having a magnetic recording layer containing uniformly dispersed magnetizable material having magnetic anisotropy, wherein the magnetizable material within selected locations of the layer is differently physically aligned from the physical alignment of the material in the remainder of the layer to provide a magnetically detectable permanent code pattern;

means for applying a magnetic field along a track parallel to said physical alignment of the material within said selected locations to magnetize the material within said at least one selected location and to differently magnetize at least a portion of the material in said remainder of the layer adjacent said selected locations, depending upon the physical alignment of the material along said track;

means for sensing the magnetization of said magnetized material along said parallel track to provide a signal representative of said selected locations;

means for applying a magnetic field along a track transverse to said physical alignment of the material within said selected locations to magnetize the material within said selected locations and to differently magnetize at least a portion of the material in said remainder of the layer adjacent said selected locations, depending upon the physical alignment of the material along said transverse track;

means for sensing the magnetization of said magnetized material along said transverse track to provide another signal representative of said selected locations; and means for comparing amplitudes of the signals produced by the sensing means to authenticate the record medium.

6. A system according to claim 5, wherein said layer within said record medium contains magnetic particles uniformly dispersed in a flexible binder, wherein the particles are physically aligned in one direction within said selected locations and are aligned perpendicular to the one direction in the remainder of the layer, and wherein the magnetization along a track transverse to said physical alignment of the material within said selected locations is parallel to the physical alignment in the remainder of the layer.

7. A system according to claim 6, wherein said particles are acicular gamma-$Fe_2O_3$.

8. A system according to claim 5, wherein said material within said selected locations is aligned in one direction and the material in the remainder of the layer is aligned perpendicular to said one direction.

9. An information processing system for interrogating a record medium, comprising:

a magnetic record medium having a magnetic recording layer containing uniformly dispersed magnetizable material having magnetic anisotropy which magnetizable material at selected locations on the layer is differently aligned from the alignment of the magnetizable material in the remainder of the layer to provide a magneticallly detectable permanent fixed information pattern, means for applying a first substantially unidirectional magnetic field to differently magnetize said magnetizable material depending upon the alignment thereof, and sensor means for sensing the magnetization of the differently magnetized material upon traversing said record medium to provide a signal representative of said fixed information pattern.

10. A system according to claim 9, further comprising means for demagnetizing said differently magnetized material in inhibit magnetic detection of the selected locations unless and until a said substantially unidirectional magnetic field is again applied to said magnetic recording layer.

11. A system according to claim 9, further comprising second sensor means for reproducing information recorded onto the record medium for data processing.

12. A system according to claim 9, further comprising means for applying a second substantially unidirectional magnetic field having its major field component transverse to the direction of said first substantially unidirectional magnetic field to differently magnetize said magnetizable particles depending upon the alignment thereof, means for sensing the magnetization of the differently magnetized particles upon traversing the record medium to provide a second signal representative of said detectable fixed information pattern, and means for comparing the amplitudes of the representative signals.

13. A method for authenticating a record medium having a magnetic recording layer containing uniformly dispersed magnetizable material having magnetic anisotropy, wherein the magnetizable material within selected locations of the layer is differently aligned from the alignment of the material in the remainder of the layer, to provide a magnetically detectable permanent code pattern, which method comprises the following steps:

applying a magnetic field along a track parallel to said alignment of the material within said selected locations to magnetize the material within said selected locations and to differently magnetize at least a portion of the material in said remainder of the layer adjacent said selected locations, depending upon the alignment of the material along said track;

sensing the magnetization of said magnetized material along said parallel track to provide a signal representative of said selected locations;

applying a magnetic field along a track transverse to said alignment of the material within said selected locations to magnetize the material within said selected locations and to differently magnetize at least a portion of the material in said remainder of the layer adjacent said selected locations, depending upon the alignment of the material along said transverse track;

sensing the magnetization of said magnetized material along said transverse track to provide another signal representative of said selected locations; and comparing amplitudes of the signals produced by the sensing means to authenticate the record medium.

14. A method according to claim 13, wherein said steps of producing magnetic fields along said parallel and transverse tracks comprises providing identical alternating magnetic fields along the respective tracks.

15. A method according to claim 13 for authenticating a record medium in which selected locations are positioned at intersections of predetermined parallel rows and parallel columns, and said columns are parallel to said direction of material alignment in the selected locations, in which method, said step of producing a magnetic field along said parallel track and said step of sensing said magnetized material along said parallel track comprises producing said field and sensing said magnetization respectively along a plurality of tracks corresponding to said columns, and said step of producing a magnetic field along a said transverse track and said step of sensing said magnetized material along said transverse track comprises producing said field and sensing said magnetization respectively along a plurality of tracks corresponding to said rows.

16. A method according to claim 15, wherein the step of comparing the signal amplitudes further comprises producing a code identification signal indicative of a selected location whenever a signal derived from a said selected location by magnetizing and sensing a track in a direction parallel to the alignment of the material within said selected location has a first amplitude, and a signal derived from the same selected location by magnetizing and sensing a track transverse to the alignment of the material within said same selected location has a second lower amplitude.

* * * * *

UNITED STATES PATENT OFFICE
CERTIFICATE OF CORRECTION

PATENT NO. : 3,873,975

DATED : March 25, 1975

INVENTOR(S) : Richard L. Miklos and Jack E. Blackburn

It is certified that error appears in the above-identified patent and that said Letters Patent are hereby corrected as shown below:

Column 3, line 60, after "direction of" insert -- physical --; Column 3, line 61, delete "physical"; Column 4, line 17, change "loctions" to -- locations --; Column 4, line 64, after "direction of" insert -- physical --; Column 5, line 47, change "backing 40" to -- backing 38 --; Column 8, line 65, change "paralel" to -- parallel --; Column 9, line 33, change "given on" to -- given one --; Column 11, line 15, change "identication" to -- identification --; Column 11, line 65, after "locations and are" insert -- physically --; Column 12, line 2, after "physical alignment" insert --of the particles --; Column 12, line 7, after "locations is" insert -- physically --; Column 12, line 9, after "is" insert -- physically --; Column 12, line 16, after "is differently" insert -- physically --; Column 12, line 16, after "from the" insert -- physical --; Column 12, line 22, after "upon the" insert -- physical --; Column 12, line 42, after "depending upon the" insert -- physical --; Column 12, line 56, after "is differently" insert -- physically --; Column 12, line 57, after "the" (first occurrence) insert -- physically --; Column 12, line 62, after "said" (first occurrence) insert -- physical --; Column 12, line 67, after "upon the" insert -- physical --; Column 13, line 5, after "said" (first occurrence) insert -- physical --; Column 13, line 10, after "upon the" insert -- physical --; Column 14, line 18, after "parallel to the" insert -- physical --; Column 14, line 21, after "transverse to the" insert -- physical --.

Signed and Sealed this

*twenty-third* Day of *September 1975*

[SEAL]

*Attest:*

RUTH C. MASON
*Attesting Officer*

C. MARSHALL DANN
*Commissioner of Patents and Trademarks*